US008479770B2

(12) United States Patent
Holtz

(10) Patent No.: US 8,479,770 B2
(45) Date of Patent: Jul. 9, 2013

(54) 4-WAY VALVE SYSTEM

(75) Inventor: Todd G. Holtz, Houston, TX (US)

(73) Assignee: Oceaneering International, Inc., Houston, TX (US)

( * ) Notice: Subject to any disclaimer, the term of this patent is extended or adjusted under 35 U.S.C. 154(b) by 586 days.

(21) Appl. No.: 12/491,730

(22) Filed: Jun. 25, 2009

(65) Prior Publication Data

US 2010/0186833 A1 Jul. 29, 2010

Related U.S. Application Data

(60) Provisional application No. 61/147,192, filed on Jan. 26, 2009.

(51) Int. Cl.
*F15B 13/04* (2006.01)

(52) U.S. Cl.
USPC ....................... 137/596.17; 137/865; 137/870

(58) Field of Classification Search
USPC ..................... 137/596, 596.17, 865, 870, 862
See application file for complete search history.

(56) References Cited

U.S. PATENT DOCUMENTS

| | | | | |
|---|---|---|---|---|
| 136,489 | A * | 3/1873 | Critchlow | 137/596 |
| 268,971 | A * | 12/1882 | Abbott | 210/425 |
| 2009/0255681 | A1* | 10/2009 | Spencer | 166/341 |

OTHER PUBLICATIONS

Barksdale Control Products, Technical Information, High Pressure Valve Series 4140, Nov. 2008, 1-2.

Radoil, Inc., Technical Information, Rotary Valves, www.radoil.com/rotary-valves.html, 2009, 1 page.

* cited by examiner

*Primary Examiner* — Craig Schneider

(74) *Attorney, Agent, or Firm* — Gary R. Maze

(57) ABSTRACT

The invention relates to valve system made up of multiple three way valves mechanically coupled together to produce the functionality of a four way valve.

20 Claims, 5 Drawing Sheets

4-WAY VALVE SYSTEM

CROSS-REFERENCE TO RELATED APPLICATIONS

This application claims the benefit of Provisional Application 61/147,192, filed Jan. 26, 2009.

FIELD OF THE INVENTION

The invention relates to valve system made up of multiple three way valves mechanically coupled together to produce the functionality of a four way valve.

DETAILED DESCRIPTION OF PREFERRED EMBODIMENTS

Figure 4:
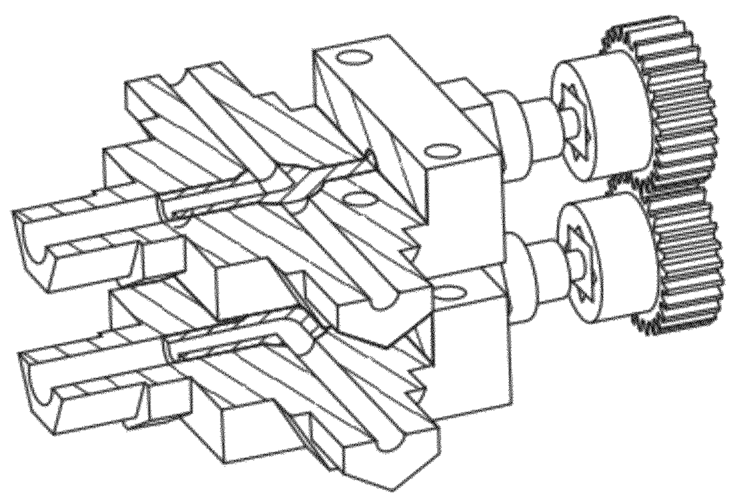
FIG. 4 is a cross-sectional view of valves suitable for use with the invention disclosed herein.
Figure 5:
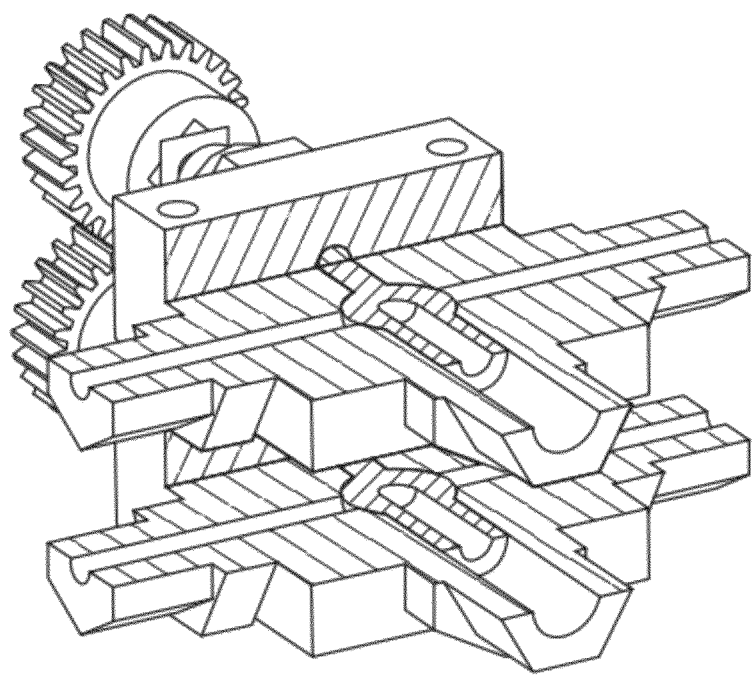
FIG. 5 is a cross-sectional view of valves suitable for use with the invention disclosed herein.
Figure 6:
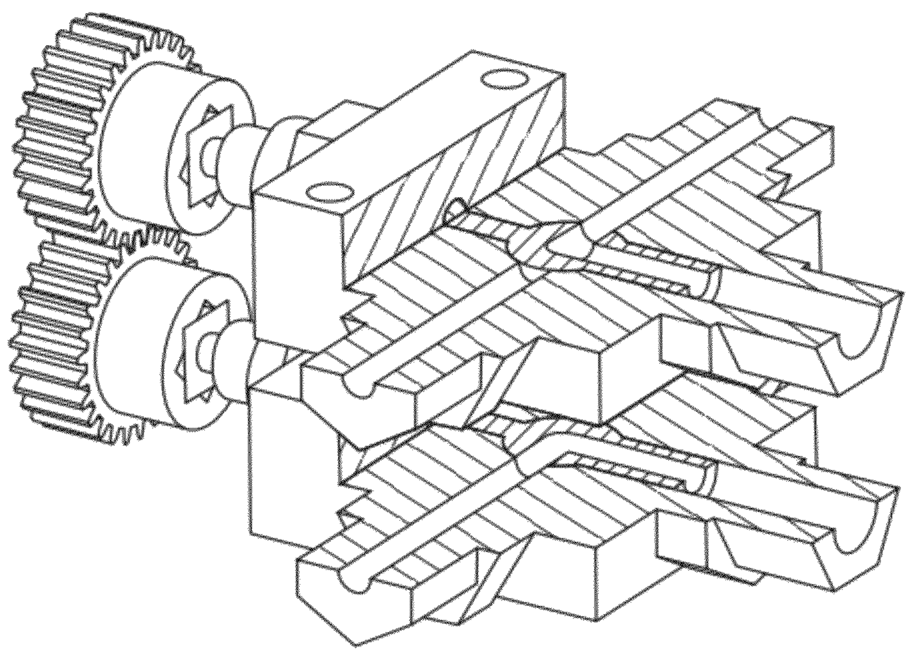
FIG. 6 is a cross-sectional view of valves suitable for use with the invention disclosed herein.

In a preferred embodiment, the invention is a valve assembly comprising a first three way valve 10 comprising a first inlet port 12, a first outlet port 14, a second outlet port 16, and a position adjustable first flow alignment device 18, as shown in FIGS. 4-7B. In another preferred embodiment, the first outlet port and second outlet port are aligned along a common axis as shown in FIGS. 4-6. In another preferred embodiment, the first inlet port is oriented substantially perpendicular to the first and second outlet ports.

This embodiment further comprises a first valve actuator 20 mechanically coupled to the first flow alignment device such that movement of the first actuator can cause the first flow alignment device to align the first inlet port with the first outlet port, align the first inlet port with the second outlet port, or align the first inlet port with no outlet ports, as shown in FIGS. 4-6. In another preferred embodiment, the first valve actuator comprises a first toothed gear and the second valve actuator comprises a second toothed gear rotatably engaged with the first toothed gear, as shown in FIGS. 4-6.

This embodiment further comprises a second three way valve 11 comprising a third outlet port 13, a second inlet port 15, a third inlet port 17, and a second position adjustable flow alignment device 19, as shown in FIGS. 4-7B. In another preferred embodiment, the second inlet port and third inlet port are aligned along a common axis, as shown in FIGS. 4-6. In another preferred embodiment, the third outlet port is oriented substantially perpendicular to the second and third inlet ports, as shown in FIGS. 4-6.

The direction of flow through any of the aligned ports disclosed herein is a function of the fluid pressure. Thus, the terms “inlet” and “outlet” as used herein are not intended to indicate that flow through such ports may only occur in one direction.

This embodiment further comprises a second valve actuator 21 mechanically coupled to the second flow alignment device such that movement of the second actuator can cause the second flow alignment device to align the third outlet port with the second inlet port, align the third outlet port with the third inlet port, or align the third outlet port with no inlet ports, as shown in FIGS. 4-6. The first and second valve actuators are coupled together such that when the first inlet port is aligned with the first outlet port, the third outlet port is aligned with the second inlet port, and when the first inlet port is aligned with the second outlet port, the third outlet port is aligned with the third inlet port, as shown in FIGS. 4-6.

Figure 2:
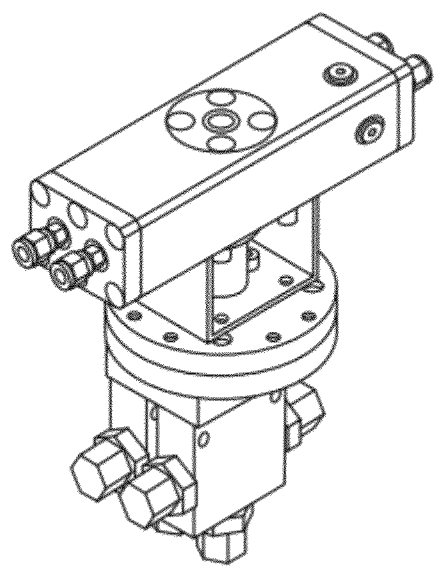
FIG. 2 is an isometric view of an embodiment of the invention disclosed herein.

In another preferred embodiment, the first and second valve actuators are hydraulically actuatable, as shown in FIG. 2. The configuration depicted in FIG. 2 uses a hydraulic actuator assembly 34 to turn the valves. It may be operated by a surface controlled valve pack. By pressurizing the actuator, pistons with a gear rack feature turn a central shaft mounted pinion. The valves are turned in the same manner as the above configuration.

In another preferred embodiment, the first three way valve is mounted above the second three way valve or the second three way valve is mounted below the first three way valve, as shown in FIGS. 4-6.

Figure 1:
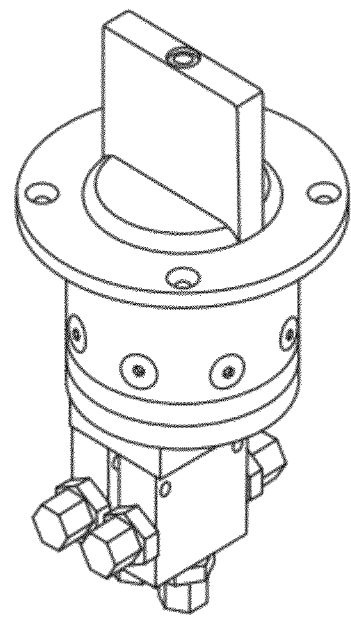
FIG. 1 is an isometric view of an embodiment of the invention disclosed herein.

In another preferred embodiment, the invention further comprising a handle 30 mechanically coupled to the first and second valve actuators. In another preferred embodiment, the handle is a paddle style handle, as shown in FIG. 1. The paddle may be turned to one of three positions by a ROV operated manipulator. This style can also be actuated by hand during surface operation.

Figure 3:
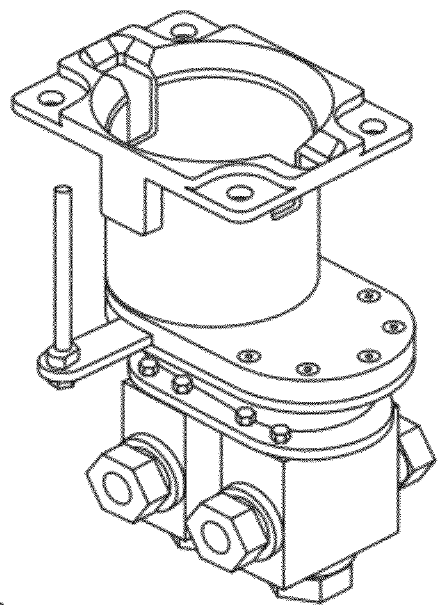
FIG. 3 is an isometric view of an embodiment of the invention.

In another preferred embodiment, the invention further comprises a torque tool bucket 32 mounted so to encompass the handle as shown in FIG. 3. The configuration in FIG. 3 would be used for larger valves that require higher torque to operate; it uses a hydraulic torque tool to turn the valve assembly. The torque tool interfaces and reacts on the bucket; the valves are operated in the same manner as the above configurations.

Figures 7A, 7B:
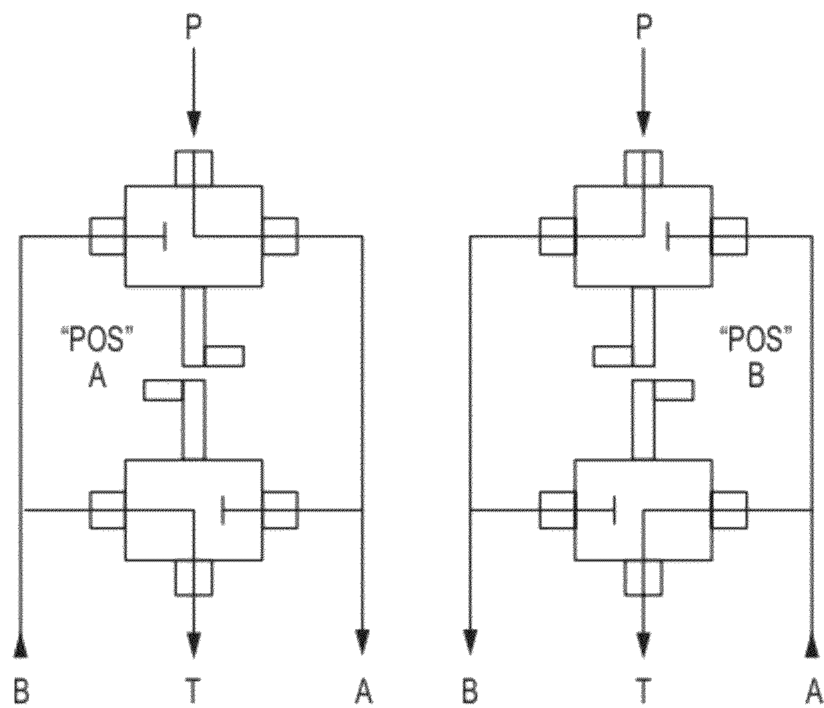
FIG. 7A is a flow diagram of the invention disclosed herein in a first alignment configuration.
FIG. 7B is a flow diagram of the invention disclosed herein in a second alignment configuration.

FIGS. 4 and 7B show the first and second flow alignment devices in a first alignment configuration wherein, the first or top valve stem port is aligned with one side of the first valve and the second or bottom valve is aligned with the opposite side of the second valve. In the configuration shown in FIG. 4, both the first and second flow alignment devices remain open and serve as fluid supply or return channels.

FIGS. 6 and 7A show the first and second valve actuators have been rotated such that the flow through the first and second flow alignment devices is now opposite from the direction of flow shown in FIGS. 4 and 7B. The configuration shown in FIGS. 6 and 7A is the second alignment configuration.

In the third alignment configuration shown in FIG. 5, the first or top valve actuator is rotated in one direction, and the second or lower valve actuator rotates in the opposite direction. In this configuration, both the first and second flow alignment devices block flow, holding pressure and flow to either side of the first and second valves. In the configuration shown in FIG. 5, the first flow alignment device aligns the first inlet port with no outlet ports, and the second flow alignment device align the third outlet port with no inlet ports.

In the models illustrated in FIGS. 1-6, and referring additionally to FIGS. 7A-7B, the connection of the two valves are not shown for clarity of the diagram. In order for the assembly to function, both "a" and "b" sides of the valve need to be connected as shown in the diagram below. The assembly operates in the same manor regardless of the style actuator or valve size.

The foregoing disclosure and description of the inventions are illustrative and explanatory. Various changes in the size, shape, and materials, as well as in the details of the illustrative construction and/or a illustrative method may be made without departing from the spirit of the invention.

What is claimed is:

1. A valve system, comprising:

a. a first three way valve comprising a housing, the housing comprising a first inlet port, a first outlet port, and a second outlet port, and a position adjustable first flow alignment device;

b. a first valve actuator mechanically coupled to the first flow alignment device such that movement of the first actuator can cause the first flow alignment device to align the first inlet port with the first outlet port, align the first inlet port with the second outlet port, or align the first inlet port with no outlet ports;

c. a second three way valve comprising a housing, the housing comprising a third outlet port, a second inlet port, and a third inlet port, and a second position adjustable flow alignment device, the first and second three way valves aligned substantially parallel to each other along two common axes such that a first predetermined set of their respective inlet and outlet ports is substantially parallel along the two common axes and a second predetermined set of their respective inlet and outlet ports is substantially perpendicular along a third common axis; and d. a second valve actuator mechanically coupled to the second flow alignment device such that movement of the second actuator can cause the second flow alignment device to align the third outlet port with the second inlet port, align the third outlet port with the third inlet port, or align the third outlet port with no inlet ports, said first and second valve actuators being coupled together such that when the first inlet port is aligned with the first outlet port, the third outlet port is aligned with the second inlet port, and when the first inlet port is aligned with the second outlet port, the third outlet port is aligned with the third inlet port;

e. the first three way and the second three way valve housings having no common inlet or outlet ports and no fluid passageways in common.

2. The valve system of claim 1, wherein the first valve actuator comprises a first toothed gear and the second valve actuator comprises a second toothed gear rotatably engaged with the first toothed gear.

3. The valve system of claim 1, wherein a flow of a first liquid through the first outlet port is diametrically opposed to a flow of a second liquid through the third inlet port along an axis in common between the first and second three way valves.

4. The valve system of claim 1, wherein to a flow of a first liquid through the second outlet port is diametrically opposed to a flow of a second liquid through the second inlet port along an axis in common between the first and second three way valves.

5. The valve system of claim 1, wherein a flow of liquid through the first inlet port and the third outlet port is substantially along one of the two common axes.

6. The valve system of claim 5, wherein the second three way comprises a ball valve.

7. The valve system of claim 1, wherein the first and second valve actuators are hydraulically actuatable.

8. The valve system of claim 1, wherein the first three way valve comprises a ball valve.

9. The valve system of claim 1, further comprising a handle mechanically coupled to the first and second valve actuators.

10. The valve system of claim 9, wherein the handle comprises a paddle style handle.

11. The valve system of claim 9, further comprising a torque tool bucket mounted so to encompass the handle.

12. A valve system, comprising:

a. a first three way valve comprising a housing, the housing comprising a first inlet port, a first outlet port, and a second outlet port, and a position adjustable first flow alignment device;

b. a first valve actuator mechanically coupled to the first flow alignment device such that movement of the first actuator can cause the first flow alignment device to align the first inlet port with the first outlet port, align the first inlet port with the second outlet port, or align the first inlet port with no outlet ports;

c. a second three way valve comprising a housing, the housing comprising a third outlet port, a second inlet port, and a third inlet port, and a second a position adjustable flow alignment device, wherein the second three way valve is mounted below the first three way valve; and d. a second valve actuator mechanically coupled to the second flow alignment device such that movement of the second actuator can cause the second flow alignment device to align the third outlet port with the second inlet port, align the third outlet port with the third inlet port, or align the third outlet port with no inlet ports, said first and second valve actuators being coupled together such that when the first inlet port is aligned with the first outlet port, the third outlet port is aligned with the second inlet port, and when the first inlet port is aligned with the second outlet port, the third outlet port is aligned with the third inlet port;

e. the first and second three way valve housings having no fluid passageway in common with each other, the first and second three way valves aligned along three axes, substantially parallel to each other with respect to two of three axes and substantially perpendicularly to each other along a third axis of the three axis, such that the first inlet port is substantially parallel to and aligned with the third outlet port, the first outlet port is substantially parallel to and aligned with the second inlet port, and the third inlet port is substantially parallel to and aligned with the second outlet port along the three axes.

13. The valve system of claim 12, wherein the first valve actuator comprises a first toothed gear and the second valve actuator comprises a second toothed gear rotatably engaged with the first toothed gear.

14. The valve system of claim 12, wherein a flow of a first liquid through the first outlet port is diametrically opposed to a flow of a second liquid through the third inlet port along one of the two common axes.

15. The valve system of claim 12, wherein a flow of liquids through each of the first inlet port and the third outlet port is substantially along one of the two common axes.

16. The valve system of claim 12, wherein each of the first three way valve and the second three way comprises a ball valve.

17. The valve system of claim 12, wherein a flow of a first liquid through the second outlet port is diametrically opposed to flow a second liquid through the second inlet port.

18. The valve system of claim 12, wherein the first and second valve actuators are hydraulically actuatable.

19. The valve system of claim 12, further comprising a handle mechanically coupled to the first and second valve actuators.

20. The valve system of claim 19, wherein the handle comprises a paddle style handle.

* * * * *